United States Patent [19]
Isayev

[11] Patent Number: 5,275,877
[45] Date of Patent: Jan. 4, 1994

[54] SELF REINFORCED THERMOPLASTIC COMPOSITE LAMINATE

[75] Inventor: Avraam Isayev, Akron, Ohio

[73] Assignee: Edison Polymer Innovation Corporation, Brecksville, Ohio

[21] Appl. No.: 691,634

[22] Filed: Apr. 25, 1991

Related U.S. Application Data

[63] Continuation-in-part of Ser. No. 392,122, Aug. 10, 1989, abandoned.

[51] Int. Cl.$^5$ .................... B05D 3/00; C08L 67/00
[52] U.S. Cl. .................... 428/294; 428/473.5; 428/480; 428/483; 264/108; 264/174; 264/DIG. 26; 525/425; 525/436
[58] Field of Search .............. 428/224, 364, 480, 483, 428/294, 473.5; 264/108, 174, DIG.; 525/425, 436

[56] References Cited

U.S. PATENT DOCUMENTS

| | | | |
|---|---|---|---|
| 4,468,364 | 8/1984 | Ide | 264/176 |
| 4,728,698 | 3/1988 | Isayev et al. | 428/294 |
| 4,820,568 | 4/1989 | Harpell et al. | 428/113 |
| 4,835,047 | 5/1989 | Isayev et al. | 428/294 |
| 5,006,402 | 4/1991 | Isayev | 428/294 |

OTHER PUBLICATIONS

Cogswell, "The Processing Science of Thermoplastic Structural Components", Intern Polymer Processing (ASM), 157-165.

Hwang et al; "Solution Processing and Properties of Molecular Composite Fibers and Films," Polymer Engineering and Science, 23 (1983), 784-788.

Primary Examiner—Patrick J. Ryan
Assistant Examiner—Richard C. Weisberger
Attorney, Agent, or Firm—Oldham, Oldham & Wilson Co.

[57] ABSTRACT

A shaped reinforced thermoplastic composite, such as composite laminate (10 or 10A), comprises a thermoplastic matrix polymer (22) and a plurality of fibers (20) of a liquid crystal polymer (LCP) which are formed in situ in the matrix polymer. This composite is formed by forming a prepreg as a plurality of individual sheets or layers (50), each of which comprises essentially unidirectionally oriented fibers (20) of said LCP in a thermoplastic polymer matrix (22). A lay-up is formed by cutting each individual sheet or layer into pieces so that the direction of fiber orientation in each such piece is either parallel to one pair of edges or at angles of 45° to all of the edges. The lay-up is shaped under heat and pressure to form the composite.

13 Claims, 17 Drawing Sheets

SELF REINFORCED THERMOPLASTIC COMPOSITE LAMINATE

CROSS-REFERENCE TO RELATED APPLICATION

This application is a continuation-in-part of co-pending application Ser. No. 07/392,122, filed Aug. 10, 1989, now abandoned.

TECHNICAL FIELD

This invention relates to composite laminates of fiber reinforced thermoplastic materials. More particularly, this invention relates to fiber reinforced thermoplastic laminates in which the reinforcing fibers are formed in situ in a matrix of thermoplastic polymer.

BACKGROUND ART

Fiber reinforced thermoplastics are well known. Reinforcing fibers may be short (e.g. chopped fiberglass) or long continuous fibers. Cogswell, "The Processing Science of Thermoplastic Structural Composites", *Intern. Polymer Processing*, 1 (1987) 4, pp. 157-165 illustrates the latter. Specifically, Cogswell describes polyether etherketone (PEEK) reinforced with carbon fibers. Cogswell further teaches that the composite may be in the form of a laminate of two or more layers or plies, and that the carbon fibers in adjacent layers may be oriented in different directions. Carbon fibers are formed separately and are thereafter incorporated into the thermoplastic matrix by conventional means.

U.S. Pat. No. 4,820,568 to Harpell et al discloses a multilayer composite comprising a plurality of prepreg layers, in which layer comprises high strength preformed fibers of conventional materials (e.g., carbon, graphite, cellulose or metal) in a polymer matrix. The fibers are oriented in the same direction.

U.S. Pat. Nos. 4,728,698 and 4,835,047, both to Isayev, et al., disclose liquid crystal fiber reinforced polymer composites in which the liquid crystal fibers are formed in situ in a matrix of flexible chain thermoplastic polymer. The essentially unidirectionally oriented fibers are formed by application of high strain rate mixing conditions.

DISCLOSURE OF THE INVENTION

This invention according to one aspect provides a shaped reinforced thermoplastic composite formed from a plurality of sheets of self-reinforced thermoplastic material, each sheet comprising essentially unidirectionally oriented fibers of a liquid crystal polymer in a matrix of a thermoplastic polymer, said fibers being formed in situ in said matrix under fiber-forming conditions.

This invention according to another aspect provides a process for preparing a shaped reinforced thermoplastic composite. This process comprises:

(a) forming a plurality of individual sheets, each sheet comprising essentially unidirectionally oriented fibers of a liquid crystal polymer in a matrix of a thermoplastic polymer, said fibers being formed in situ in said matrix under fiber-forming conditions;

(b) stacking said individual sheets to form a lay-up; and (c) shaping said lay-up into a coherent shaped reinforced thermoplastic composite under heat and pressure.

The shaped reinforced thermoplastic composite may be a composite laminate, and the invention will be described with particular reference thereto.

The lay-up may be formed so that the fibers in the individual sheets or layers are oriented either in the same direction or in different directions. In the former case, the resulting composite will be anisotropic, i.e., mechanical properties in the fiber direction will be different from the corresponding properties in other directions. On the other hand, by proper orientation of the fibers in individual sheets or layers in different directions (e.g., in two directions at right angles to each other), an essentially isotropic composite is attained.

BRIEF DESCRIPTION OF THE DRAWINGS

This invention will be described in further detail with particular reference to the accompanying drawings, in which.

Figure 1:
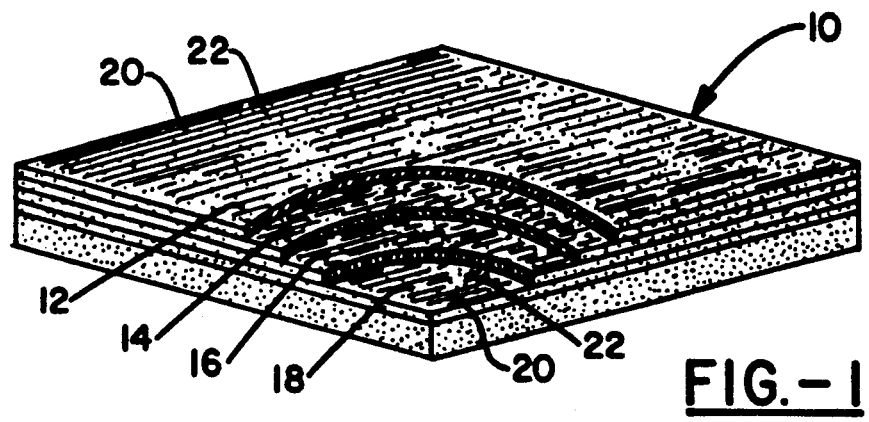
FIG. 1 is a schematic isometric view of a composite laminate according to one embodiment of the invention, in which the direction of fiber orientation in all layers is the same.

All anisotropic composite laminates referred to above in this "Brief Description of the Drawings" are laminates as shown in FIG. 1 of the drawings, in which the fibers in all layers are oriented in the same direction. All isotropic laminates referred to in the drawings and in this "Brief Description of the Drawings" are laminates in which the fibers in alternate layers are oriented at angles of −45°, 0° +45°, and 90° with respect to the longitudinal direction of an adjacent layer of the composite laminate. The lay-ups for such laminates is shown in FIG. 5A.

BEST MODE FOR CARRYING OUT THE INVENTION

This invention will be described with particular reference to formation of composite laminates.

Referring now to FIG. 1, 10 is a composite laminate according to one embodiment of this invention. Laminate 10 comprises a plurality of layers, including layers 12, 14, 16 and 18. Additional layers (not shown in detail in FIG. 1) may be present. Each layer comprises a plurality of liquid crystal polymer (LCP) fibers 20, which are essentially unidirectionally oriented, in a matrix 22 of a thermoplastic polymer. These fibers 20 are formed in situ in the matrix under fiber-forming conditions to be hereinafter described. The fibers 20 in all of the layers in the embodiment of FIG. 1 are oriented in the same direction, i.e., the lengthwise direction (parallel to the lengthwise edge of the laminate). The laminate shown herein is square, so that one edge is arbitrarily taken as the lengthwise edge. Of course, it will be understood that the laminate may be of rectangular or other desired shape.

Each layer in laminate 10 is obtained from an individual prepreg sheet by shaping techniques to be described hereinafter. Thickness of laminate 10 is less than the total thickness of the prepreg sheets prior to shaping. Total thickness of the pre-preg sheets prior to shaping, divided by the thickness of the shaped laminate 10, is the reduction ratio. The reduction ratio is always greater than 1; the larger the reduction ratio, the greater the degree of compression during shaping. Laminate 10 of any desired thickness can be obtained simply by choice of the number of prepreg sheets used to prepare the laminate.

Normally all layers of laminate 10 have the same thermoplastic matrix polymer. The boundary lines between adjacent layers shown in FIG. 1 in that case are actually indiscernible in a laminate of this invention. These lines are shown for convenience and explanation of the invention.

Figure 1A:
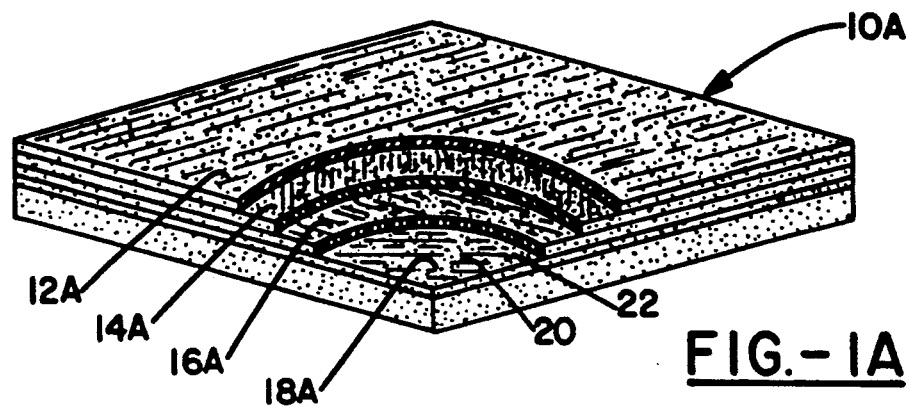
FIG. 1A is a schematic isometric representation of a composite laminate according to a second embodiment of the invention, in which the fibers in different layers are oriented in different directions so as to give an essentially isotropic composite laminate.
Figure 2:
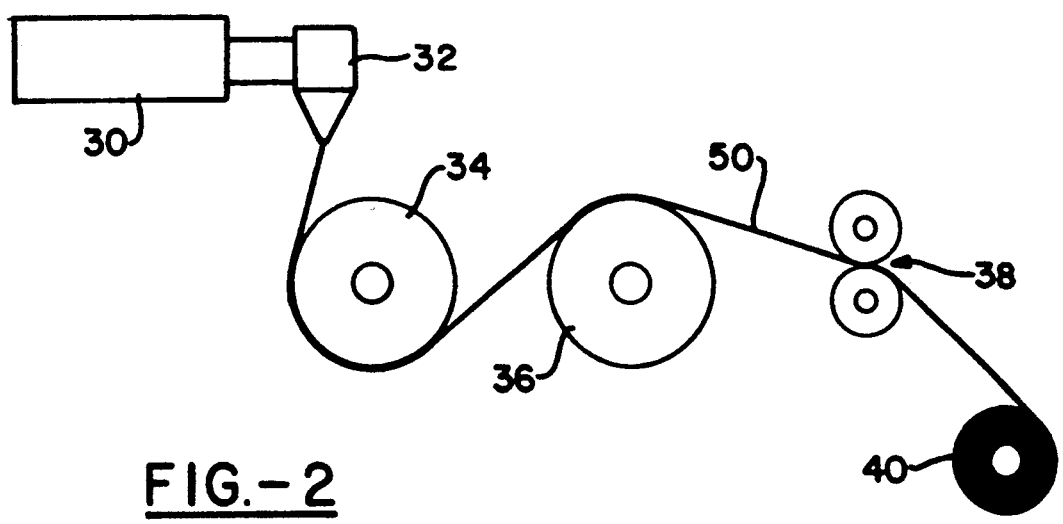
FIG. 2 is a schematic view of the process and apparatus for forming a prepreg in the form of an individual layer or sheet according to this invention.

FIG. 1A shows a composite laminate 10A having a plurality of layers 12A, 14A, 16A and 18A, plus additional layers not shown in detail as desired. Each layer comprises a plurality of essentially unidirectionally oriented LCP fibers 20 in a matrix 22 of thermoplastic polymer. However, fibers 20 in different layers of this composite laminate are oriented in different directions, e.g., at 0°, 45°, 90° and 135° (i.e., −45°) with respect to the lengthwise edge of the laminate 10A (other suitable fiber orientation patterns will be discussed subsequently). Where more than 4 layers are present in laminate 10A, the fiber orientation pattern shown in the first 4 layers of 12A, 14A, 16A and 18A may repeat throughout the laminate. A fiber orientation pattern such as that shown in FIG. 1A gives an essentially isotropic laminate, i.e., one whose mechanical properties are essentially the same in both the lengthwise and width wise directions. But in contrast, the laminate 10 of FIG. 1 is anisotropic, displaying different mechanical properties, such as greater ultimate strength and higher modulus in the direction of fiber orientation than in the direction transverse thereto.

Figure 5B:
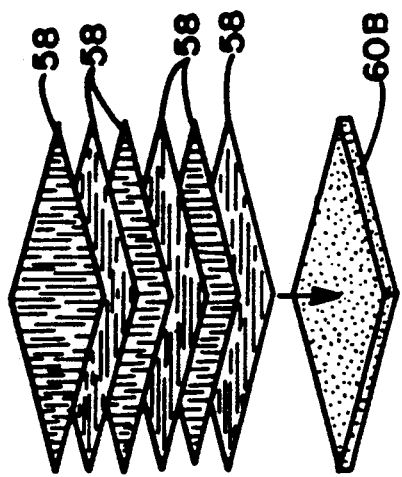
FIGS. 5, 5A, 5B and 5C are schematic diagrams showing various prepregged lay-ups for producing a composite laminate. These differ in the different patterns of fiber orientation with respect to the respective sheet edges and with respect to adjacent sheets or layers.
Figure 5A:
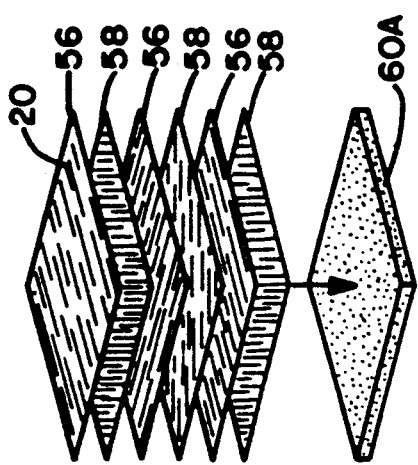

Another fiber orientation pattern which gives an essentially isotropic laminate is shown in FIG. 5B. In this laminate, all fibers are oriented diagonally with respect to the longitudinal edge of the laminate, fibers in one set of alternate sheets being oriented at an angle of +45° with respect to the longitudinal edge, and the fibers in the other set of alternate sheets being oriented at an angle of −45° with respect to the longitudinal edge, so that fibers in every sheet are oriented at a 90° angle with respect to the direction of fiber orientation in the layer on either side thereof.

The required starting materials for preparing the novel composite laminates of this invention are a thermoplastic matrix (or base) polymer and a liquid crystal polymer (LCP). An LCP herein is in accordance with the art-recognized definition, i.e., a polymer which is anisotropic even in the liquid phase.

The matrix polymer is a flexible chain polymer, i.e., one in which successive units of the polymer chain are free to rotate with respect to each other, so that the polymer chain can assume a random shape. The matrix polymer is either amorphous or semi-crystalline. Suitable matrix polymers for this invention include conventional thermoplastic materials such as polyethylene, polypropylene, ethylene-propylene copolymers, polystyrene and styrene co-polymers, polyvinyl chloride (PVC), polyamide (nylon), polyesters such as polyethylene terephthalate, polyether etherketone (PEEK), polyphenylene sulfide, polyphenylene oxide, polyetherimide, polybutylene terephthalate, and polycarbonate. Of particular interest are the so-called engineering plastics (or high performance polymers), which are characterized by high temperature resistance and good mechanical properties. These include, for example, PEEK, polyethermide, and polyphenylene sulfide.

The liquid crystal polymer (LCP) is a polymer which exhibits anisotropy (i.e., "crystallinity") in the liquid phase. The liquid crystal polymers used in this invention are thermotropic, i.e., they have a melting point or glass transition temperature or both and are melt processable.

Suitable liquid crystal polymers for this invention may be divided into two classes: those having a melting point and a glass transition temperature and those having a glass transition temperature only. Preferred liquid crystal polymers in both classes are wholly aromatic copolyesters.

Representative thermotropic liquid crystal polymer starting materials are wholly aromatic co-polyesters such as those described in U.S. Pat. Nos. 3,991,014; 4,067,852; 4,083,829; 4,130,545; 4,161,470; 4,318,842; and 4,468,364; or such as those described in U.S. Pat. Nos. 4,722,993; 4,727,129; 4,727,131; 4,728,713; 4,728,714; 4,762,907; and 4,788,272.

The base polymer and the LCP must have an overlapping processing temperature range. That is, the maximum processing temperature of the base polymer is above the minimum processing temperature of the LCP. The minimum processing temperature of the LCP should be higher than the minimum processing temperature of the base or matrix polymer. In the case of an LCP having both a melting point and a glass transition temperature (which is always below the melting point), the processing temperature lies entirely above the melting point. In the case of an LCP having a glass transition temperature only (i.e., no melting point) the processing temperature range lies above the glass transition temperature.

The LCP must be incompatible with the matrix polymer. That is, addition of the LCP to the base polymer has little effect on the glass transition temperature (Tg) or the melting point of the base polymer. For purposes of this invention, all thermoplastic polymers are classified either as amorphous or semi-crystalline, since as far as the inventor is aware no thermoplastic polymer is completely crystalline. Thus, the polymers which are referred to as "crystalline" in the published literature would be classified as semi-crystalline herein.

A suitable wholly aromatic co-polyester thermotropic liquid crystal polymer of the first class is a co-polyester having a melting point of about 275° C. and supplied by Celanese Research Company, Summit, N.J., under the designation "Vectra A 950". This material will be referred to herein as "LCP-1". This polymer is believed to consist essentially of about 25-27 percent of 6-oxy-2-naphthyl moieties and about 73-75 percent of p-oxybenzoyl moieties, as described in example 4 of U.S. Pat. No. 4,468,364 and in G. W. Calundann, et al. "Anisotropic Polymers, Their Synthesis and Properties", reprinted from Proceedings of the Robert A. Welch Conferences on Chemical Research, XXVI Synthetic Polymers, Nov. 15-17, 1982, Houston, Tex., pp. 247-291 (see especially pp. 263-265). Another wholly aromatic co-polyester LCP consists of p-oxybenzoyl moieties and oxybiphenylene terephthaloyl moieties, and is available commercially under the tradename "Xydar" from Amoco Company, Chicago, Ill.

A suitable wholly aromatic co-polyester of the second class is a thermotropic rigid rod material sold by Badische Anilin und Sodafabrik (BASF) of Ludwigshafen, Germany under the trademark "ULTRAX" KR-4002. This material is believed to be a wholly aromatic co-polyester comprising p-oxybenzoyl, terephthaloyl and hydroquinone moieties, and is believed to be generally similar in composition to the materials described in the above cited U.S. Pat. Nos. 4,722,993; 4,727,129; 4,727,131; 4,728,723; 4,728,724; 4,762,907; and 4,788,272. This material will be designed herein as "LCP-2". This material has a glass transition temperature of about 120° C. as shown by the peak of a curve showing tan δ as a function of temperature. (Glass transition temperature can also be measured by DSC, but applicant has found tan δ to be more precise).

Suitable systems for making composite laminates of the present invention include: polyetherimide and LCP-1 (herein denoted as PEI/LCP-1), polyphenylene oxide (PPO) and LCP-1 (herein PPO/LCP-1), and polypropylene (PP) and LCP-2 (herein PP/LCP-2). More broadly, other wholly aromatic co-polyesters of the first class (those having melting points) may be substituted for LCP-1 and wholly aromatic co-polyesters of the second class (those having glass transition temperatures) may be substituted for LCP-2. In general, however, any thermoplastic base polymer as described above can be paired with a liquid crystal polymer of either class, provided that the LCP is incompatible with the base polymer and the base polymer and the LCP having an overlapping melt processing temperature range.

Another series of particular suitable composites according to this invention are those made from PEEK as the base polymer and the aforesaid "Xydar" as the liquid crystal polymer.

The amount of liquid crystal polymer in a composite laminate 10 or 10A of this invention may range from about 2 to about 98 percent by weight of LCP, preferably about 5 to about 95 percent of LCP, balance essentially thermoplastic matrix polymer. In all cases, the LCP must be present in a fiber-forming amount, i.e., one which will result in the formation of LCP fibers in situ when a blend of the matrix polymer and the LCP is processed as hereinafter described. Fiber forming amounts vary from system to system. For example, in polyetherimide/LCP-1 systems, the amount of LCP may be anywhere from about 5 to about 95% by weight of the blend (the sum of PEI and LCP), but best mechanical properties in injection molded samples are obtained when the amount of LCP is at least 40% by weight, preferably at least 50% by weight. Fiber forming amounts of LCP in any system which meets the other requirements (incompatibility of the base polymer and the LCP and overlapping melt processing temperature range) can be determined experimentally by making a series of compositions of progressively increasing LCP content, ranging from 0% to 100% LCP at desired intervals (say 10 percentage points) and then subjecting the blend to high strain rate mixing conditions as hereinafter described.

Additional materials are not required but may be present. Thus, it is within the scope of the invention to prepare a mixed composite polymer by inclusion of an additional reinforcing fiber, such as glass, carbon or aramid, in addition to the liquid crystal polymer. The additional reinforcing fiber may be incorporated into either the base polymer or the liquid crystal polymer. The additional reinforcement provided by the additional fiber is not necessary in most cases, but where a very high stiffness (or very high strength) reinforced polymer composite is desired, such can be attained according to the present invention without the high loadings of conventional reinforcing fiber required in presently known polymer/fiber composites.

Other additives, such as pigments and fillers, coupling agents, flame retardants, lubricants, mold release agents, plasticizers and ultraviolet stabilizers, may be mixed with the base polymer and liquid crystal polymer as desired. The use of such additives is well known in the polymer processing art.

The preferred process for making composites of this invention will now be described with particular reference to FIGS. 2 through 5 of the drawings.

The matrix polymer and the liquid crystal polymer are mixed at a temperature at which both are processable by suitable means which will assure thorough mixing of the two polymers. Any additional ingredients which are desired in the final product are also mixed in at this time. The mixing apparatus 30 may comprise, for example, an extruder followed by a static mixer. This extruder may be either a single screw extruder or a twin screw extruder. A particularly suitable extruder for the practice of this invention is a Killion one inch single screw extruder, sold by Killion Extruders, Inc. of Riviera Beach, Fla. Other suitable extruders (disclosed in U.S. Pat. Nos. 4,728,698 and 4,835,047) include a ZSK 30 twin screw extruder, sold by Werner & Pfleiderer Corp. of Ramsey, N.J. When a single screw extruder is used, the extruder is followed by a static mixer such as a 6-element Koch Model No. KMB-150 static mixer, made and sold by Koch Industries. In any case, the extruder (and the static mixer when used) must be provided with a heating jacket, preferably one which permits zoned heating, so that the matrix polymer and the LCP may be heated from ambient temperature to processing temperature.

The base polymer, liquid crystal polymer, and any additional ingredients are fed in solid form to the mixing apparatus 30. The base polymer and the liquid crystal polymer are conveniently fed in the form of pellets. These pellets may be either a mixture of pure base polymer pellets and pure LCP pellets, or polymer blend pellets.

The processing temperature in mixing apparatus 30 is a temperature at which both polymers are melt processable. This is a temperature above the glass transition temperature or melting point, as the case may be, of the matrix polymer and above the melting point or glass transition temperature of the LCP.

The melt blend of LCP and base polymer is passed from the mixing apparatus 30 to a sheet forming die 32, shown herein as a "coat hanger" die, where it is subjected to high deformation conditions resulting in fiber formation in situ.

Figure 3:
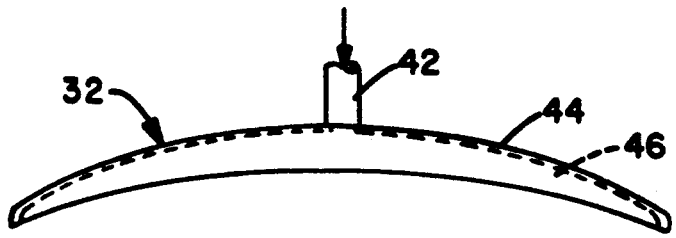
FIG. 3 is a front elevational view of a "coat hanger" sheet-forming die used in the process of this invention.
Figure 3A:
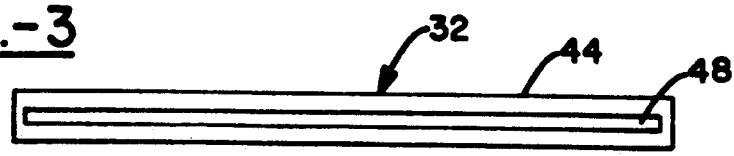
FIG. 3A is a bottom view, looking up, of the die shown in FIG. 3.

Die 32, shown in detail in FIG. 3 and 3A, comprises an inlet 42, a housing 44, which surrounds a cavity 46, and a discharge slit 48 along its lower edge. Discharge slit 48 is long and narrow and preferably adjustable. The polymer blend as it exits from die 32 is in the form of a thin sheet and its dimensions are essentially the same as the dimensions of the slit 48. This thin sheet is passed successively over a first roll 34 and a second roll 36, both of which may be either stationary rolls or rotatable idler rolls. Then the sheet passes through the nip of a pair of rolls 38, which consist of a pair of closely spaced motor driven counter rotating rolls having a pre-determined clearance therebetween. Rolls 38 are driven at a faster speed than that of the sheet emerging from die 32, so that stretching or drawing of the continuous sheet of polymer blend takes place. This stretching or drawing results in essentially uniform orientation of the fibers 20 of LCP's which are contained in the matrix polymer.

The extension ratio (also known as "stretch ratio" or "draw ratio") in the process herein is the ratio of the driven speed of rolls 38 to that of the sheet emerging from die 32. While these limits may vary, it is necessary to use an extension ratio high enough to result in essentially uniform fiber direction on the one hand, while not so high as to cause the formation of holes in sheet 50 on the other. Actually, it is believed that a combination of extruder temperature and extension ratio (the former must not be too low and the latter must not be too high), rather than extension ratio alone, is responsible for hole formation in the continuous sheet 50. Conditions which cause hole formation can be determined experimentally on a composition by composition basis.

Finally, this continuous sheet 50 is wound up on a motor driven wind-up roll 40.

Figure 4:
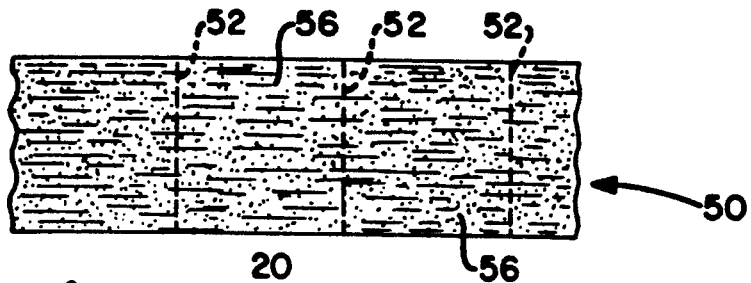
FIG. 4 is a fragmentary isometric view of a prepreg in the form of an individual sheet according to this invention, showing fiber orientation and also showing by dotted lines a pattern for transverse cutting of this sheet.
Figure 4A:
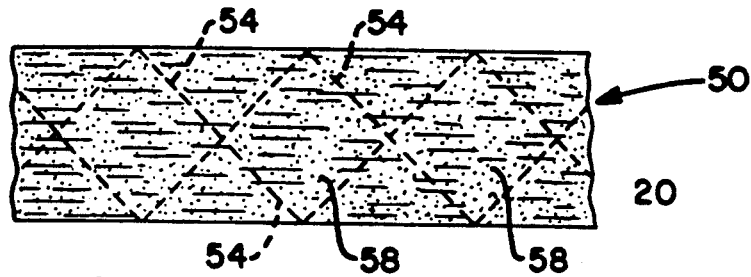
FIG. 4A is similar to FIG. 4 except that the dotted lines show a pattern for diagonal cutting of the sheet.

Prepreg sheet 50 is cut into square or rectangular pieces, either transversely along dotted lines 52 shown in FIG. 4, or diagonally (at a 45° angle to the edges) along dotted lines 54 as shown in FIG. 4A. Square pieces are shown for the purpose of illustration. Transverse cutting as shown in FIG. 4 forms pieces 56 in which the direction of fibers 20 is parallel to one edge of the piece. Cutting diagonally as shown in FIG. 4A results in pieces 58 in which the direction of orientation of fibers 20 as at 45° angles with respect to the edges or the piece.

Figure 5:
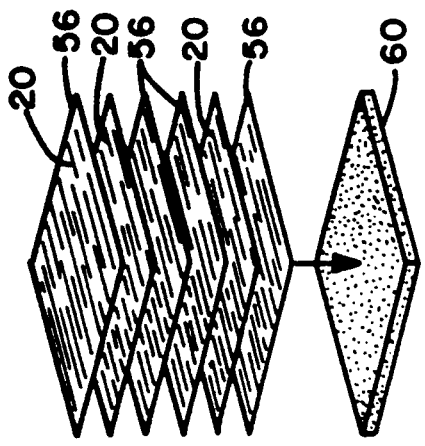
Figure 5C:
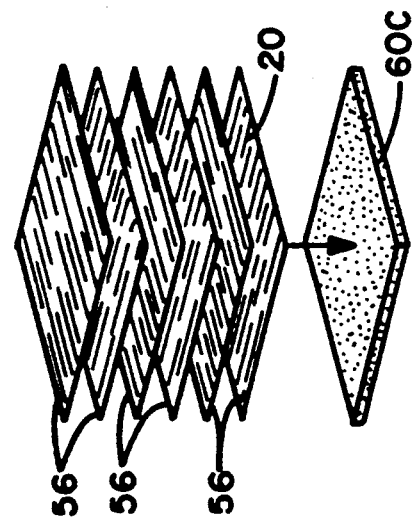

A prepreg lay-up is formed as shown in FIGS. 5 through 5C.

A prepreg lay-up is produced by stacking a plurality of prepreg sheets 56 or 58 in a desired pattern, as shown in FIGS. 5 through 5C. According to a first pattern, shown in FIG. 5, a plurality of sheets 56, in which the fibers 20 extend parallel to two opposite edges, are laid up so that the fibers 20 in every sheet 56 are oriented in the same direction. This results in a lay-up 60, consisting of uncompressed individual sheets 56 in which all fibers 20 are oriented in essentially the same direction. This laminate 60, upon shaping, produces an anisotropic coherent composite laminate 10 as shown in FIG. 1, in which the fibers 20 throughout the laminate are oriented in essentially the same direction.

Other lay-up patterns are shown in FIGS. 5A, 5B and 5C. In FIG. 5A, sheets 56 (fibers 20 oriented parallel to opposite edges) and 58 (fibers oriented diagonally at a 45° angle) are laid up in alternating sequence, resulting in a lay-up 60A of uncompressed sheets in which there are four different fiber directions, i.e., at angles of 0°, 45°, 90° and 135° (−45°) with respect to the lengthwise extending edges of the lay-up (in the case of the square lay-up, one pair of edges is arbitrarily chosen as the lengthwise extending edges). This lay-up 60A, when molded, gives an essentially isotropic composite laminate 10A as shown in FIG. 1A. Since the fibers in this composite laminate 10A extend in different directions which are evenly spaced around the circumference of the circle, the laminate is essentially isotropic, which means that the mechanical properties in either the length direction or the width direction are essentially the same.

Other essentially isotropic composite laminates can be attained by following the lay-up patterns illustrated in FIGS. 5B and 5C. In FIG. 5B, a plurality of sheets 58 (diagonally oriented fibers) are laid up so that the direction of fiber orientation of each sheet is at a 90° angle to the direction of fiber orientation of the sheet on either side thereof. Stated another way, the fiber direction in every other sheet is +45° (with respect to the lengthwise edges) and the fiber direction in the alternate sheets is −45°. This pattern carries through lay-up 60B and in the composite laminate produced therefrom. Finally, FIG. 5C shows a lay-up pattern which utilizes the plurality of sheets 56, with the fibers extending lengthwise (0°) in every other sheet and crosswise (90°) in the alternating sheets. This pattern carries into the lay-up 60C and the composite laminate produced therefrom.

The composite laminates produced from lay-ups 60B and 60C are essentially isotropic, since the reinforcing fibers 20 therein extend in two mutually perpendicular directions.

Figure 6:
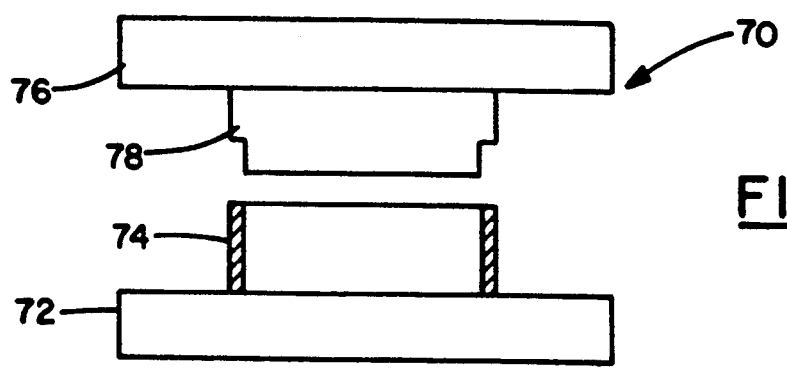
FIG. 6 is a diagrammatic view of a molding machine used in the practice of this invention.

Lay-ups 60, 60A, 60B and 60C are shaped under heat and pressure, preferably by compression molding, as shown diagrammatically in FIG. 6. The preferred apparatus for forming composite laminates 10 or 10A is a conventional compression mold 70. Such mold may comprise a stationary lower platen 72 having an upwardly extending mold cavity member 74 mounted thereon, and a vertically reciprocable upper platen member 76 having a mold cavity member 78 extending downwardly therefrom. Mold cavity members 74 and 78 are of mating shape. A lay-up 60, 60A, 60B or 60C is placed in the lower mold cavity member 74. The upper mold cavity member is lowered to molding position, and heat and pressure are applied. The molding temperature is above the glass transition temperature or melting point of the matrix polymer but below the melting point of the LCP, so that the LCP fibers in individual layers do not disintegrate during processing. For instance, when a preferred LCP having a melting point, "Vectra A950", which has a melting point of 275° C. is used, a suitable molding temperature is about 260° C. It is believed that the molding temperature should be below the melting point of an LCP which has a melting point, since otherwise it is believed that fiber structure of the LCP will disappear during molding and the reinforcing action of the fibers will be lost. On the other hand, it has been found possible to mold compositions employing an LCP having a glass transition temperature at temperatures which are higher than the glass transition temperature without loss of the desirable mechanical properties of the fiber reinforced composite.

The molding pressure and time must be sufficient to cause consolidation of the lay-up into a coherent composite laminate. At the end of the molding period, the upper platen 76 is lifted and the composite laminate is allowed to cool to ambient temperature in the lower mold cavity 74. The cooled laminate is then removed and is ready for testing or use.

The nature of the fibers formed will vary somewhat from composition to composition. Usually, however, the fibers will have a diameter from about 1 to about 10 microns, although larger diameter fibers may produced in some cases. The shape may range from comparatively short rods (e.g., having a length about 5 to 10 times the diameter) to long continuous fibers. Generally, however, the fibers will be essentially unidirectionally oriented in the direction of flow during processing (the "machine direction"). The fibers are believed to consist essentially of the LCP in the thermoplastic base polymer forming the matrix. All or part (usually a large part) of the LCP is in the form of fibers, and all or nearly all of the LCP is in the form of domains which are recognizable under a scanning electron microscope.

To obtain shaped fiber reinforced thermoplastic composite articles other than composite laminates, a mold having dies giving the desired shape are used in place of the conventional compression mold. Fibers in such composite will extend essentially unidirectionally if the lay-up pattern of FIG. 5 is used, and in different directions if any of the lay-up patterns of FIGS. 5A, 5B or 5C is used.

The present invention provides high performance, high strength, high modulus, high impact and high temperature resistant fiber reinforced thermoplastic composites. While considerable success has been achieved previously in preparation of long fiber reinforced thermoset resins, success in making long fiber reinforced thermoplastic composites has been more limited. The present invention provides fiber reinforced thermoplastic composites and an economical process for preparing the same. Processing is considerably simplified by the fact that the reinforcing fibers are formed in situ rather than being formed separately in a previous operation and then encapsulated into a polymer matrix.

The LCP-thermoplastic blends of this invention give composites having mechanical properties, e.g., tensile strength and secant modulus, which are as good or nearly as good ( and in some cases better than ) those of the pure LCP, at substantially lower cost since the thermoplastic base polymer is nearly always much less expensive than the LCP.

Mechanical properties of anisotropic laminates are substantially better in the machine or fiber direction than in the transverse or cross direction. On the other hand, mechanical properties of essentially isotropic laminates are similar in any direction. Tensile strength and modulus in isotropic laminates are usually somewhere between the fiber direction values and the transverse values in anisotropic laminates of the same composition.

Figure 13:
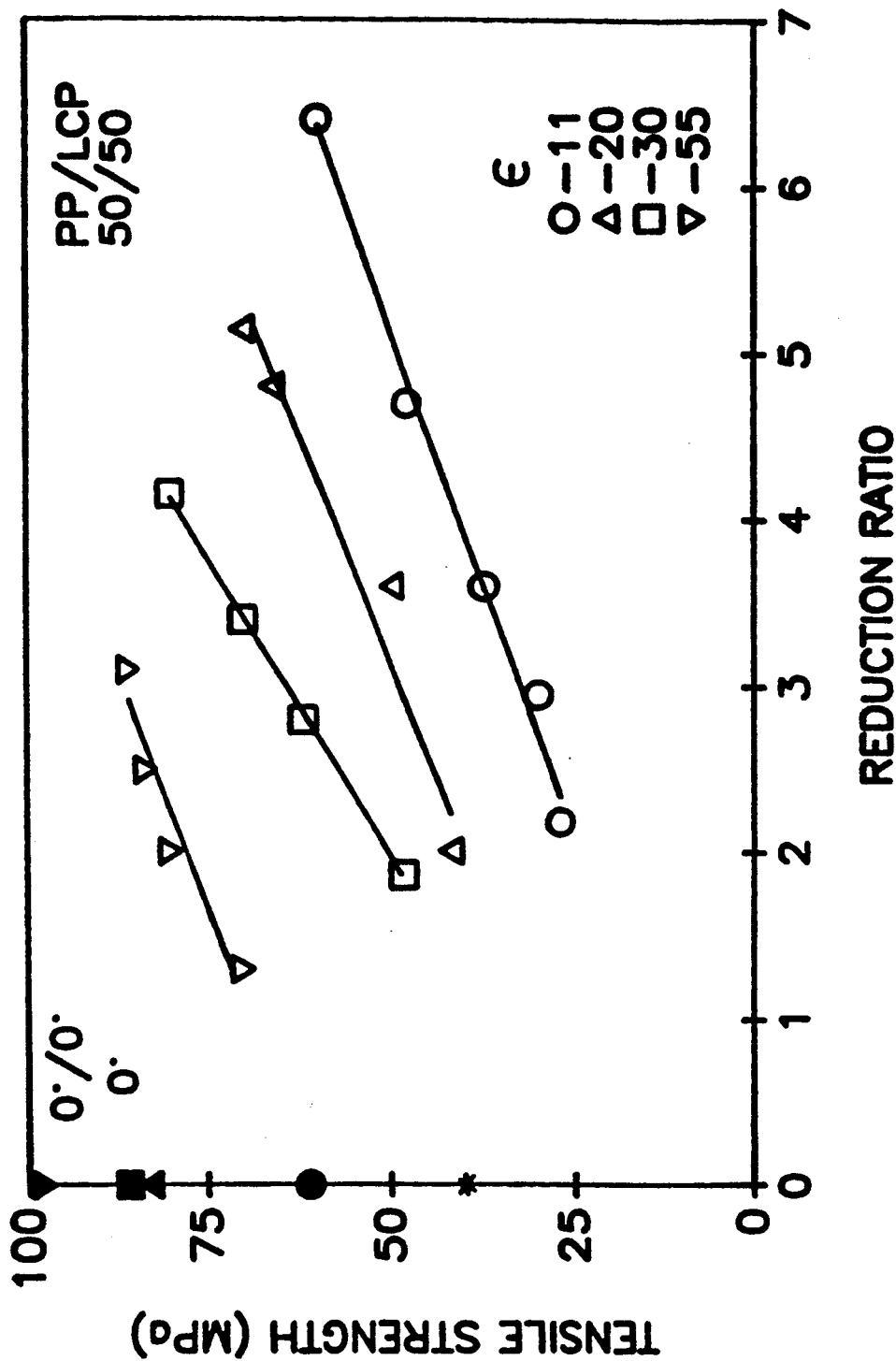
FIG. 13 is a graph showing tensile strength, measured in the direction of fiber orientation, as a function of reduction ratio at various extension ratios in an anisotropic 50/50 polypropylene/liquid crystal polymer (PP/LCP) composite laminate.
Figure 14:
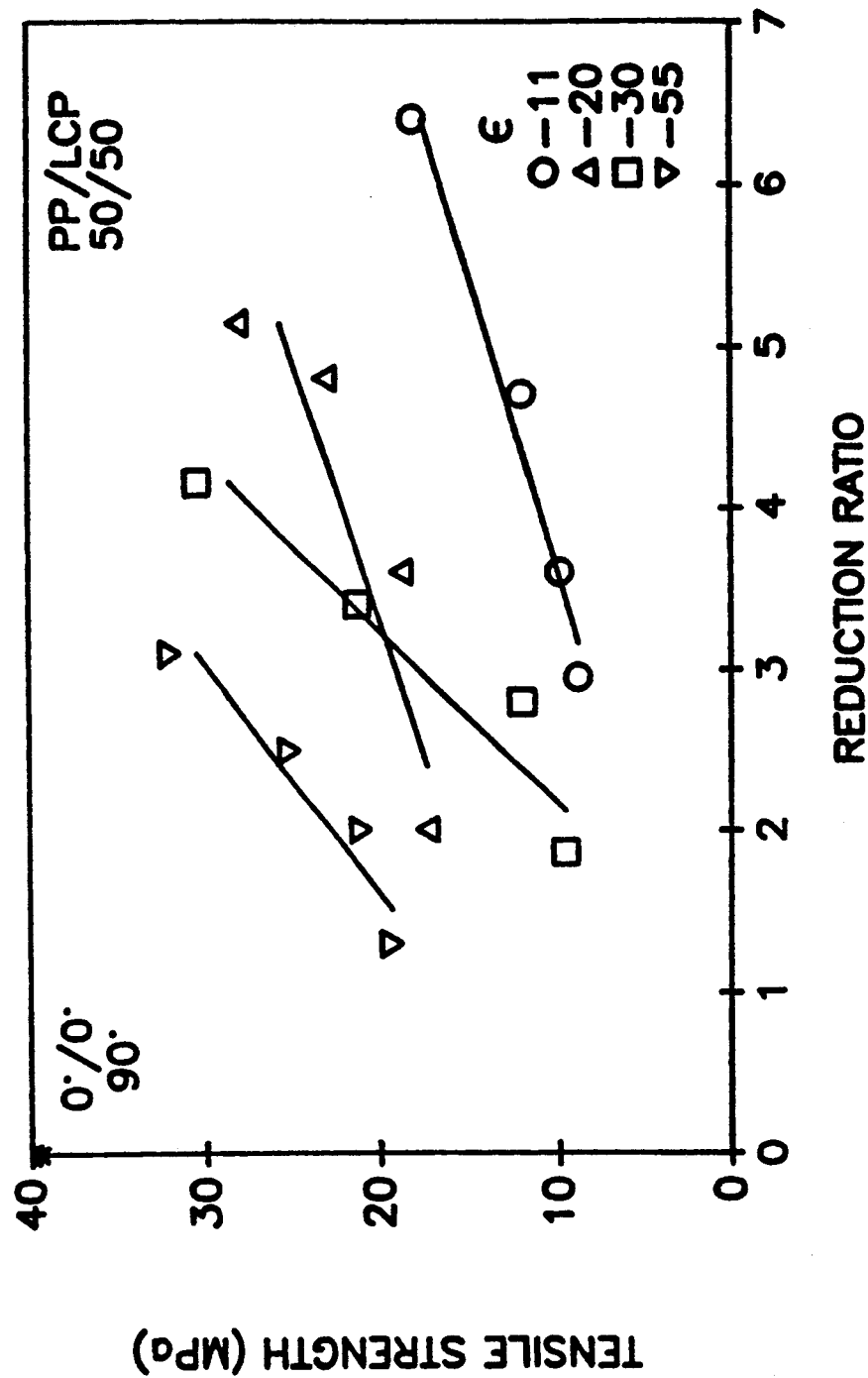
FIG. 14 is a graph showing tensile strength measured in the cross direction, as a function of reduction ratio at various extension ratios in an anisotropic 50/50 polypropylene/LCP composite laminate.
Figure 15:
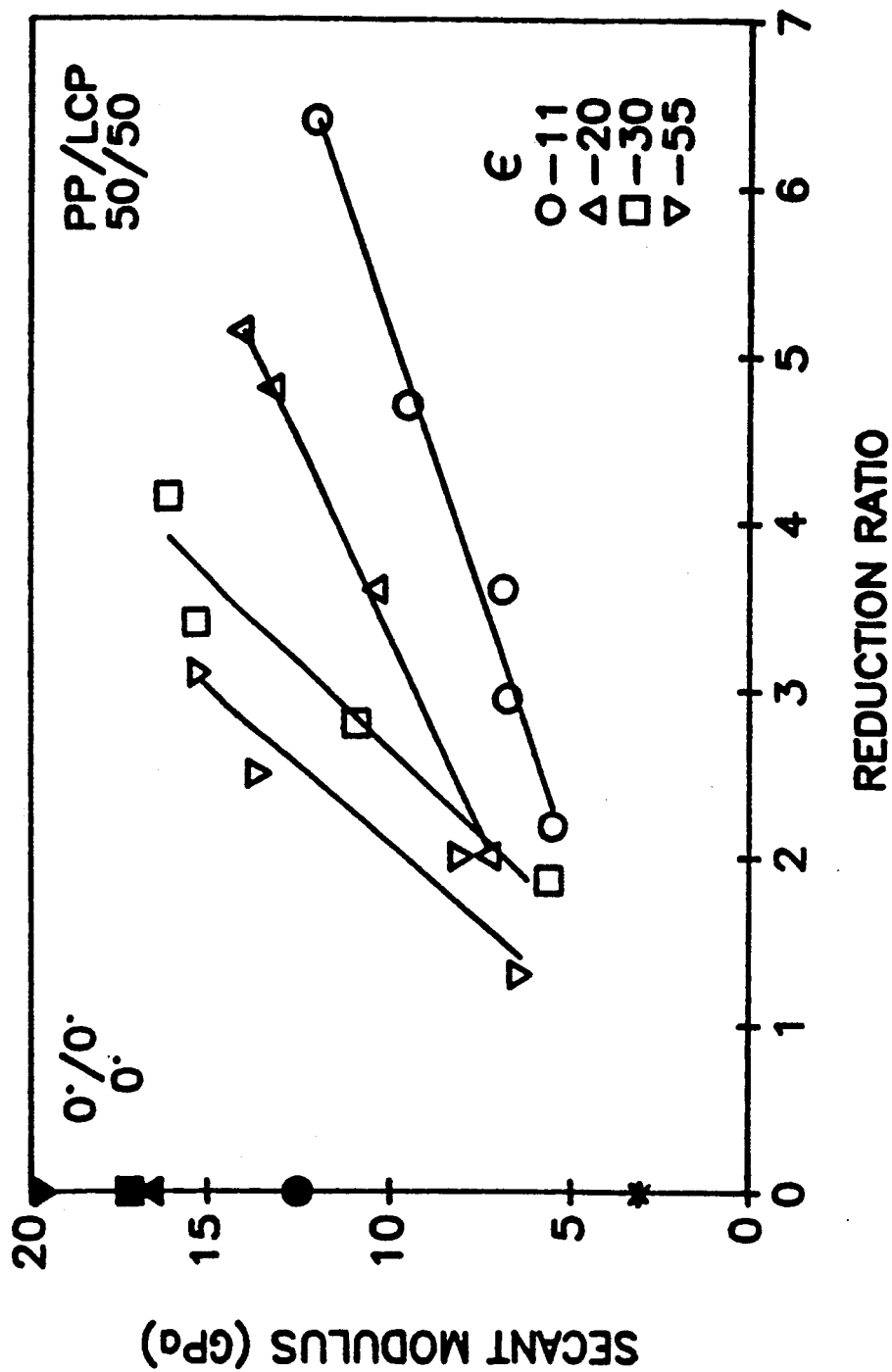
FIG. 15 is a graph showing secant modulus, measured in the direction of fiber orientation, as a function of reduction ratio in an anisotropic 50/50 PP/LCP laminate.
Figure 16:
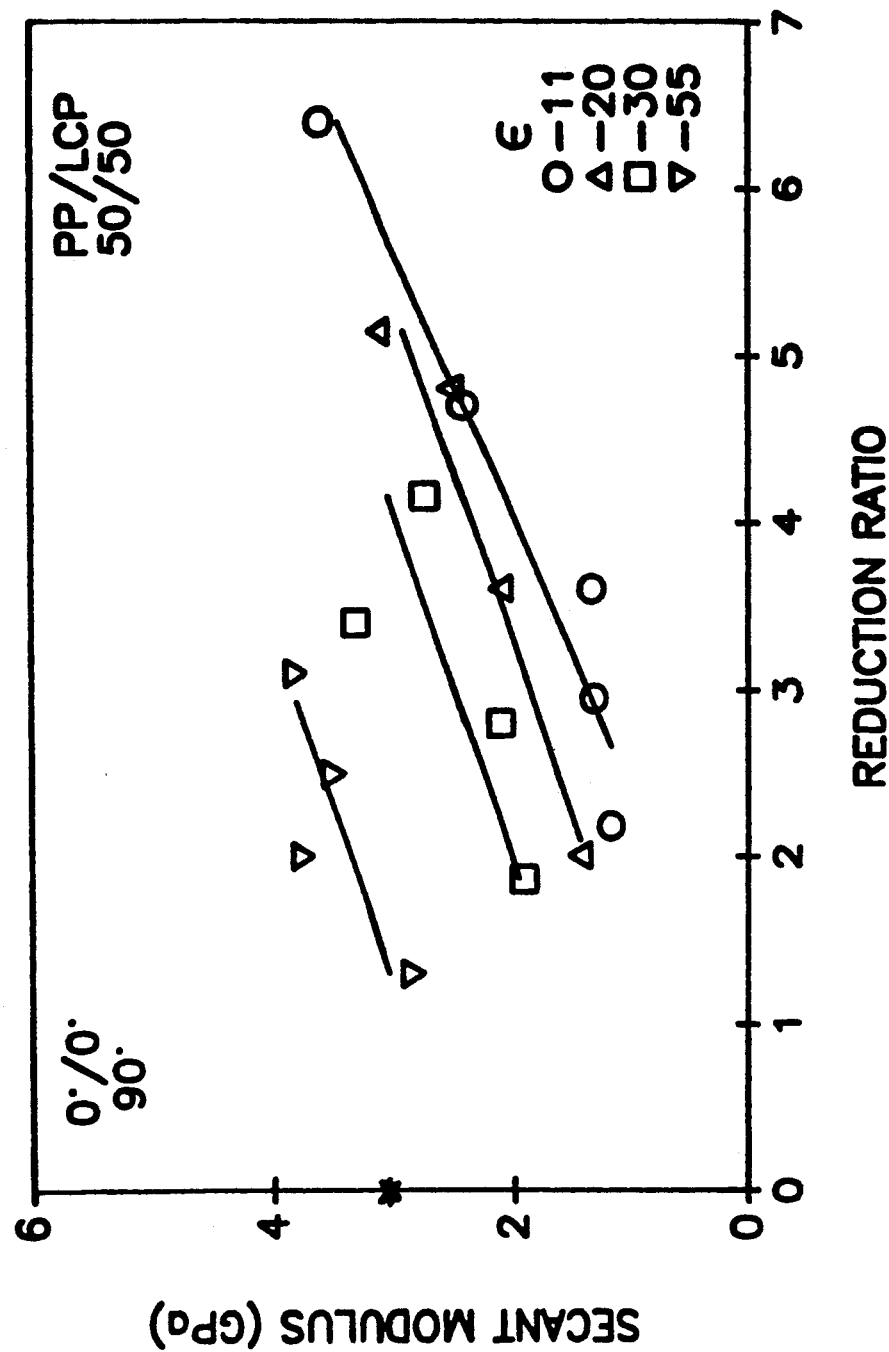
FIG. 16 is a graph showing secant modulus, measured in the cross direction, as a function of reduction ratio at various extension ratios in a 50/50 polypropylene composite laminate.

Certain laminates of this invention, notably those prepared from polypropylene and LCP-2, exhibit tensile strength and secant modulus (measured in the flow direction in an anisotropic laminate) which are markedly and unexpectedly better than the respective strength and secant modulus in an injection molded non-laminated test specimen of the same composition, as may be seen, for example, in FIGS. 13 and 15. In those figures, the asterisks along the left hand axis represents the value obtained in the injection molded non-laminated specimen. Measurements on the injection molded non-laminated test specimens were taken in the fiber direction. Tensile strength and secant modulus have been found to be independent of reduction ratio in compositions formed with a liquid crystal polymer having a melting point, but to be influenced by reduction ratio (increasing as the reduction ratio increases) in compositions or blends from an LCP having a glass transition temperature only.

The process of this invention saves energy. Energy requirements are less than those required to form otherwise similar laminates containing preformed reinforcing fibers.

Composites of the present invention are particularly useful in the automotive, aircraft and marine industries. In particular, composites of this invention are useful in making automobile body parts and boat hulls. In general, composites of this invention are useful in making articles or parts where high tensile strength, high modulus and/or high impact strength are advantageous, particularly where for reasons of weight it is desirable to use reinforced plastic instead of metal. Other uses will be apparent to those skilled in the art.

This invention will now be described further with reference to the example which follows.

EXAMPLE 1

This example describes the preparation of a composite laminate 10, having the fiber configuration shown in FIG. 1 (i.e., all fibers extending in the same direction). This composite laminate consists of 20 percent by weight of polyetherimide (the matrix polymer) and 80 percent by weight of a thermotropic liquid crystal polymer (LCP).

The polyetherimide used is "Ultem" 1000, made by General Electric Company, Schenectady, N.Y. This is an amorphous polymer having a glass transition temperature of 215° C.

The liquid crystal polymer is "Vectra" A 950, distributed by Celanese Research Corp. of Summit, N.J., and is identified as "LCP-2" herein. This polymer has a melting point of 275° C. and is believed to consist essentially of about 25-27 mole percent of 6-oxy-2-naphthyl moieties and 73-75 mole percent of p-oxybenzoyl moieties.

Pellets of a PEI/LCP blend, prepared according to U.S. Pat. No. 4,835,047 to Isayev, et al, are charged to the inlet of a Killion single screw extruder having a one inch barrel diameter. This extruder is sold by Killion Extruders, Inc. of Riviera Beach, Fla. This extruder has three heating zones 1-3 (zone 1 is near the feeder end); two heating zones 4 and 5 are in the region connecting the extruder and the die 32. Die 32 has a single heating zone. All zones except number 4 are operated at 330° C.; zone 4 is operated at 325° C. The screw speed is 30 rpm. A motor current of 4 amperes is used. The pressure at the die entrance is 180 psi.

The melt blend is passed continuously from the screw extruder 30 to a coat hanger die 32. This die has a heating jacket and a discharge slit 150 mm. × 1.5 mm. Sheet 50 is extruded from die 32 at a speed of 4.5 in./min. The extruded sheet 50 passes over rolls 34 and 36 and then through the nip of a pair of rolls 38. The clearance between rolls 38 is 0.68 mm. Rolls 38 are driven at a peripheral speed of 10 in./min., giving an extension ratio of 2.2. (This extension ratio is the ratio of peripheral speed of roll 38 to that of the sheet emerging from die 32). Sheet 50 is wound up on wind-up roll 40.

The long continuous prepreg sheet is cut into pieces approximately 4 inches. Eight of these pieces are laid up in the cavity of a compression mold so that the fibers in all pieces are oriented in the same direction (i.e., as shown in FIG. 5). The upper mold die member is lowered and heat and pressure (260° C., 1000 psi) are applied for one hour. The mold is then opened and the composite laminate formed therein is removed after it has cooled to approximately ambient temperature. A laminate having a thickness of 0.106 inch is obtained.

The composite laminate samples are cut into narrow test strips 0.28 inch wide × 2.5 inch long × 0.106 inch thick. The longitudinal direction of these test strips is the same as the fiber direction. Tensile test at an elongation speed of 0.02 inch/min. shows a modulus of 13.8 GPa at 0.2 percent elongation in the fiber direction. It is not possible obtain a tensile strength (ultimate strength) result because the sample broke at the grips used to hold the sample ends for tensile testing.

EXAMPLE 2

The procedure of Example 1 is followed except that the lay-up pattern shown in FIG. 5A is used. In this lay-up pattern, four fiber directions are used. The respective fiber direction angles in each layer from top to bottom in the mold cavity (measured from the longitudinal edge of the example to a line parallel to the predominant fiber direction) as follows: 0 degree, 45 degree, 90 degree, minus 45 degree, minus 45 degree, 90 degree, 45 degree, 0 degree. A composite laminate as shown in FIG. 1A is obtained. The composite laminate thus obtained is tested in the same manner as the composite laminate obtained in Example 1. A modulus at 0.2 percent elongation is 12.8 GPa.

EXAMPLE 3

This example describes preparation of an anisotropic composite laminates from a 50/50 (by weight) blend of polyphenylene oxide (PPO) and LCP-1.

The PPO was grade 646, supplied by General Electric Company, Schenectady, N.Y. The liquid crystal polymer was LCP-1, as described in Example 1.

The apparatus and procedure are as described in Example 1 except as otherwise noted.

The polymers are dried at 80° C. for 24 hours prior to extrusion.

The apparatus comprises a 1 inch single screw extruder (Killion, Inc.) as described in Example 1, connected to a static mixer (Koch Industries, Inc.) as described earlier in this specification, and a coat hanger die. The coat hanger die has a length of 0.158 meters and a lip of 0.002 meter.

The blending temperature in the mixing apparatus 30 (collectively the single screw extruder and the static mixer) is 285° C. The screw rotation speed is 75 rpm. The molding temperature is 260° C. (which is below the melting point of LCP-1). Molding pressure is 700 psi, and molding time is 15 minutes. A laminate of 8 layers or sheets is prepared.

Figure 7:
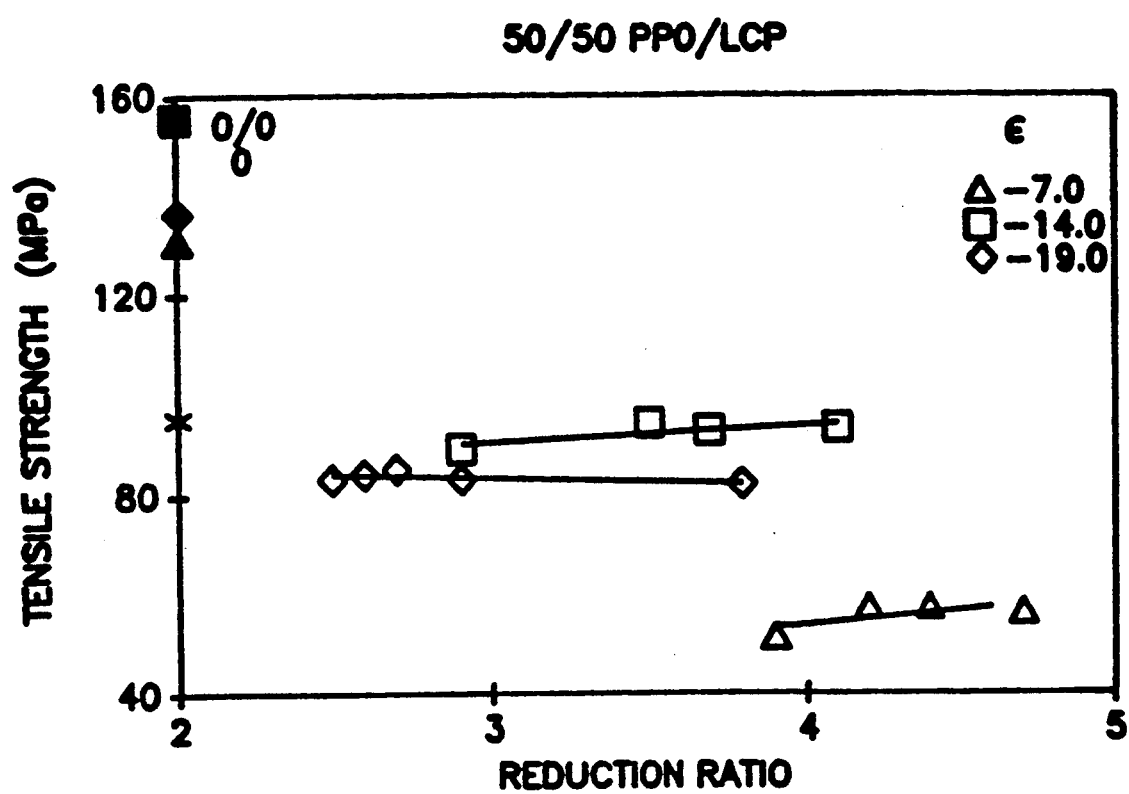
FIG. 7 is a graph showing tensile strength, measured in the direction of fiber orientation (the machine direction) in an anisotropic 50/50 polyphenylene oxide as a function of liquid crystal polymer (PPO/LCP) composite laminate at various reduction ratio at various extension ratios. (The terms, "reduction ratio" and "extension ratio" are defined and explained hereinafter).
Figure 8:
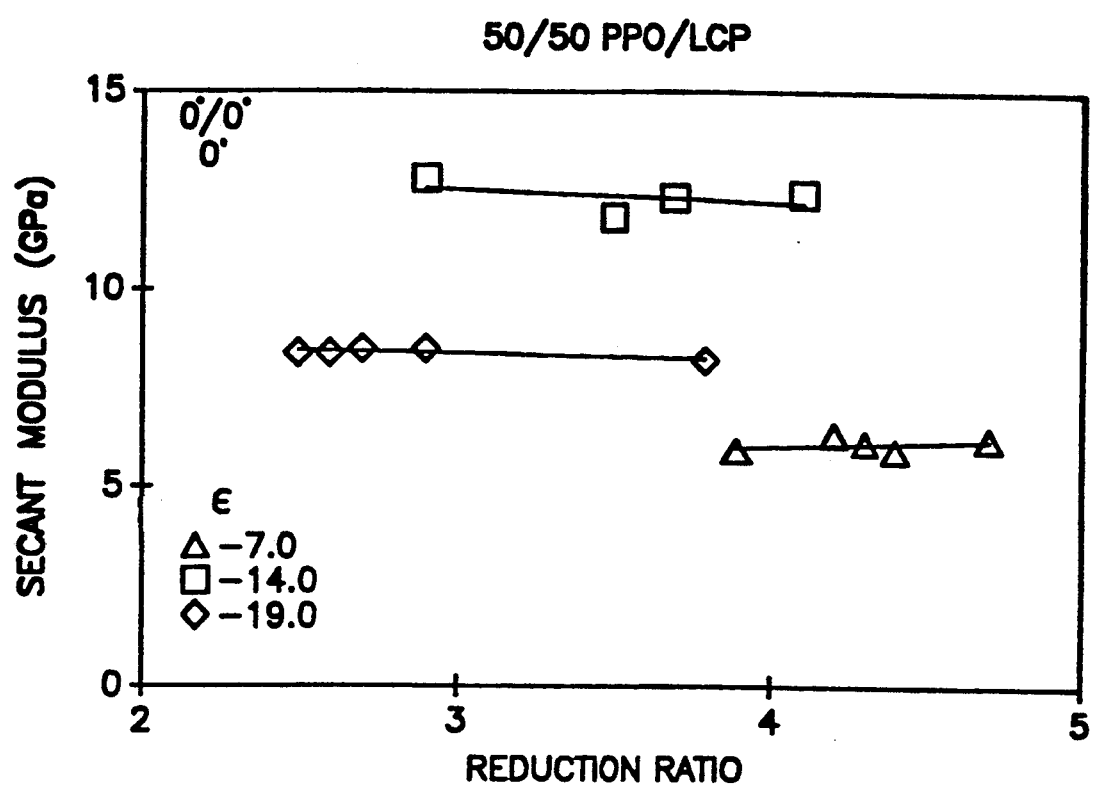
FIG. 8 is a graph showing secant modulus, measured in the direction of fiber orientation (the machine direction), in an anisotropic 50/50 PPO/LCP composite laminate.

Results are shown graphically in FIGS. 7 and 8.

FIG. 7 shows that tensile strength (measured in the fiber direction) is dependent on extension ratio (indicated by the symbol $\epsilon$ in the drawings) (increasing as extension ratio is increased) but is independent of reduction ratio. Tensile strength in megapascals varies from about 45-50 MPa at an extension ratio of 7 to about 93 MPa at an extension ratio of 19.

For comparison, tensile strengths in single sheets, prepared at the same extension ratios (with no reduction) are shown by the filled symbols along the left hand axis. Tensile strength of an injection molded non-laminated test specimen (about 90 MPa) is shown by the asterisks along the left hand axis. This same symbolism for comparison samples is used in all of the graphs (FIGS. 7-10).

Secant modulus is shown graphically in FIG. 8. Secant modulus is also shown to be a function of extension ratio but to be independent of reduction ratio.

EXAMPLE 4

An isotropic composite laminate of 8 sheets is prepared from a 50/50 PPO/LCP-1 blend, using the conditions of Example 3 and the lay-up pattern of FIG. 5A.

Figure 9:
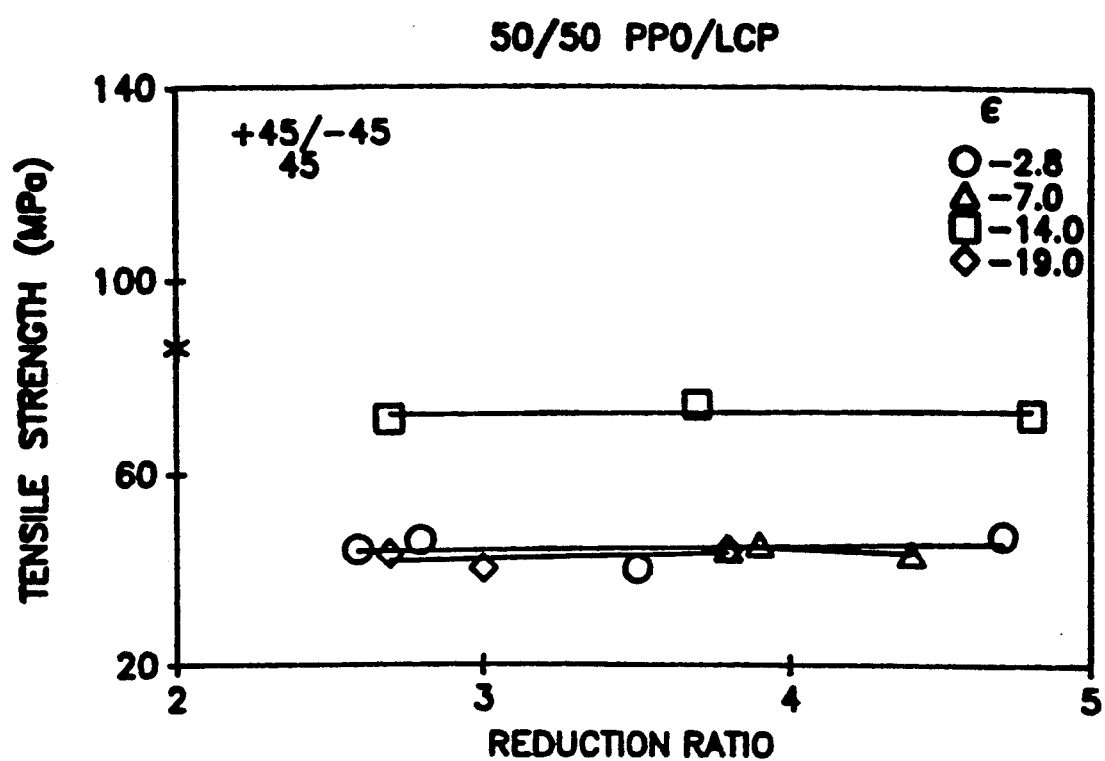
FIG. 9 is a graph showing tensile strength as a function of reduction ratio in a isotropic 50/50 PPO/LCP composite laminate at various extension ratios.
Figure 10:
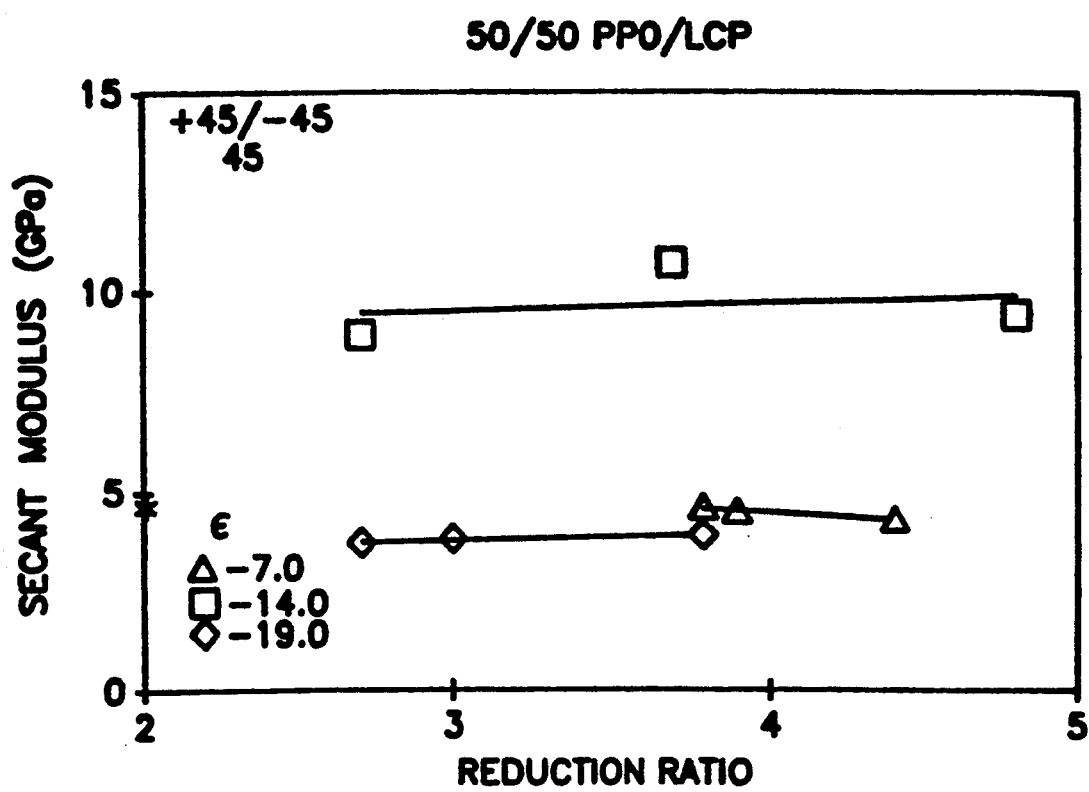
FIG. 10 is a graph showing secant modulus as a function of reduction ratio in an isotropic 50/50 PPO/LCP composite laminate.

Tensile strength and secant modulus, as a function of reduction ratio at various extension ratios, are shown graphically in FIGS. 9 and 10. For comparison, the tensile strength and secant modulus of a non-laminated injection molded test specimen is shown by the asterisks along the left hand axis in FIGS. 9 and 10.

Figure 11:
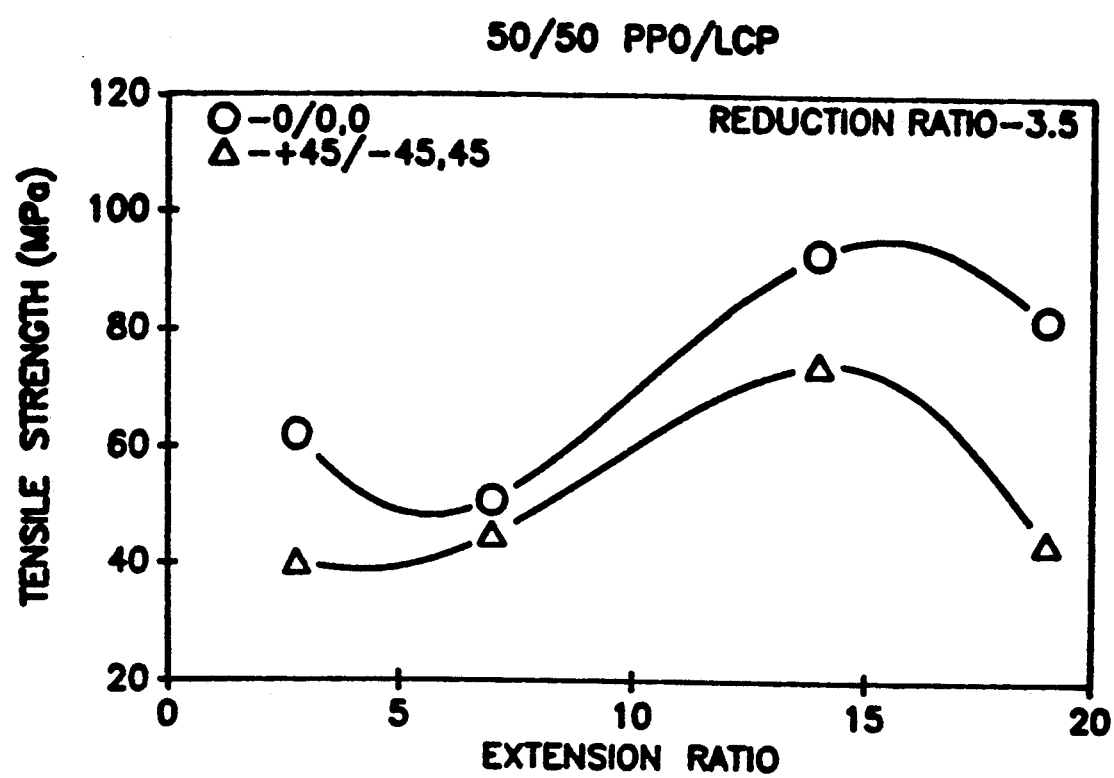
FIG. 11 is graph showing tensile strength as a function of extension ratio at a constant reduction ratio in 50/50 PPO/LCP composite laminates, both anisotropic and isotropic.
Figure 12:
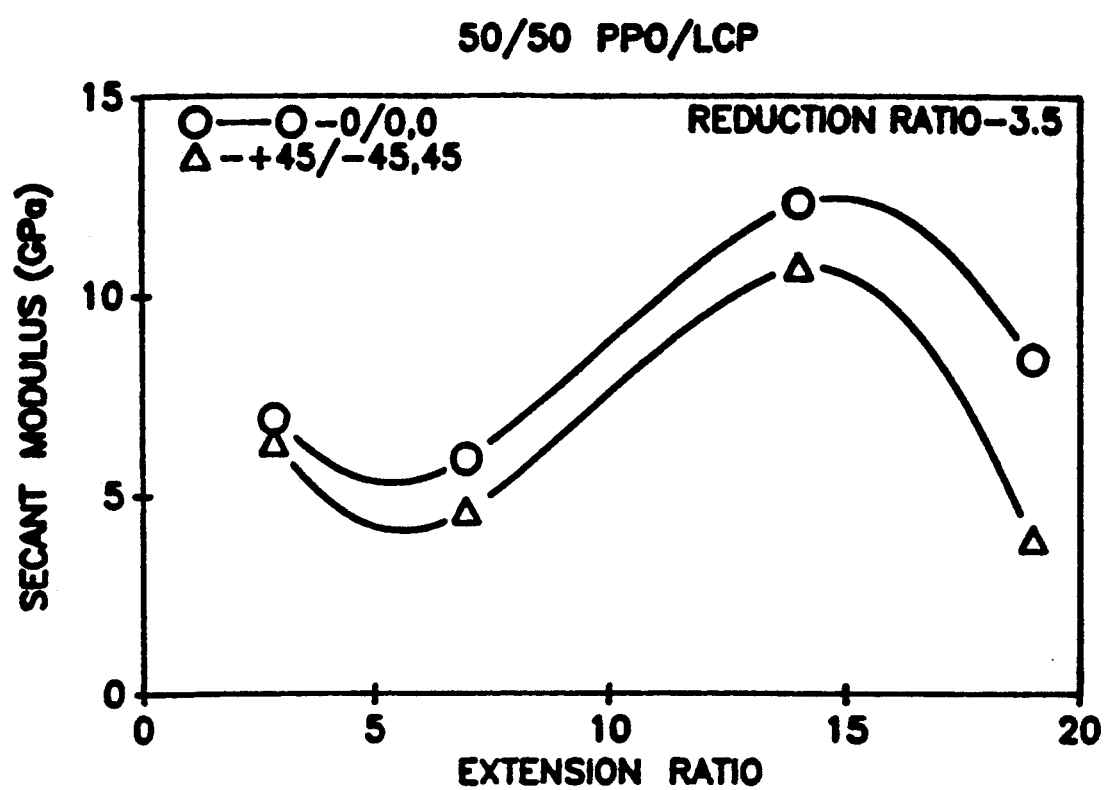
FIG. 12 is a graph showing secant modulus as a function of extension ratio at a constant reduction ratio in both anisotropic and isotropic 50/50 PPO/LCP composite laminates.

FIGS. 11 and 12 are graphical presentations of tensile strength and secant modulus, respectively, as functions of extension ratio (ranging from 2.8 to 19) at a constant reduction ratio (3.5). Data are taken from the test composite laminates of Examples 3 and 4.

EXAMPLE 5

This Example describes preparation and testing of a composite laminate of 50% by weight of polypropylene (PP) and 50% by weight of LCP-2.

Polypropylene is "Profax" 6523, supplied by Himont, Inc., LCP-2 is supplied by BASF under the tradename, "ULTRAX" KR-4002, and is more fully described earlier in this specification.

The blend temperature is 245° C. and rotational speed of the extruder screw is 60 rpm; otherwise, apparatus and operating conditions are as described in Example 3. A composite laminate of 16 sheet is prepared at 177° C. and a pressure of 700 psi.

Tensile strength and secant modulus, measured in both the fiber direction and the transverse direction as a function of reduction ratio at various extension ratios, are shown graphically in FIGS. 13-16. For comparison, FIGS. 13 and 15 also show (as filled symbols along the left hand axis) the corresponding values in single sheets formed at the same extension ratios, and the asterisks show the corresponding values in injection molded non-laminated test specimens.

The data shows that tensile strength and secant modulus are a function of both reduction ratio and extension ratio. The data further shows that, except at low extension ratios, tensile strength in the composite laminate is better than that in an injection molded sample, while secant modulus in the composite laminate is better than that in an injection molded sample at all extension ratios measured. This is unexpected since no improvement was to be expected in a composite laminate as compared to an injection molded non-laminated sample.

EXAMPLE 6

This example described preparation and testing of an isotropic composite laminate of a 50/50 blend of polypropylene and LCP-2.

Materials, apparatus and operating conditions are as described in Example 5.

Figure 17:
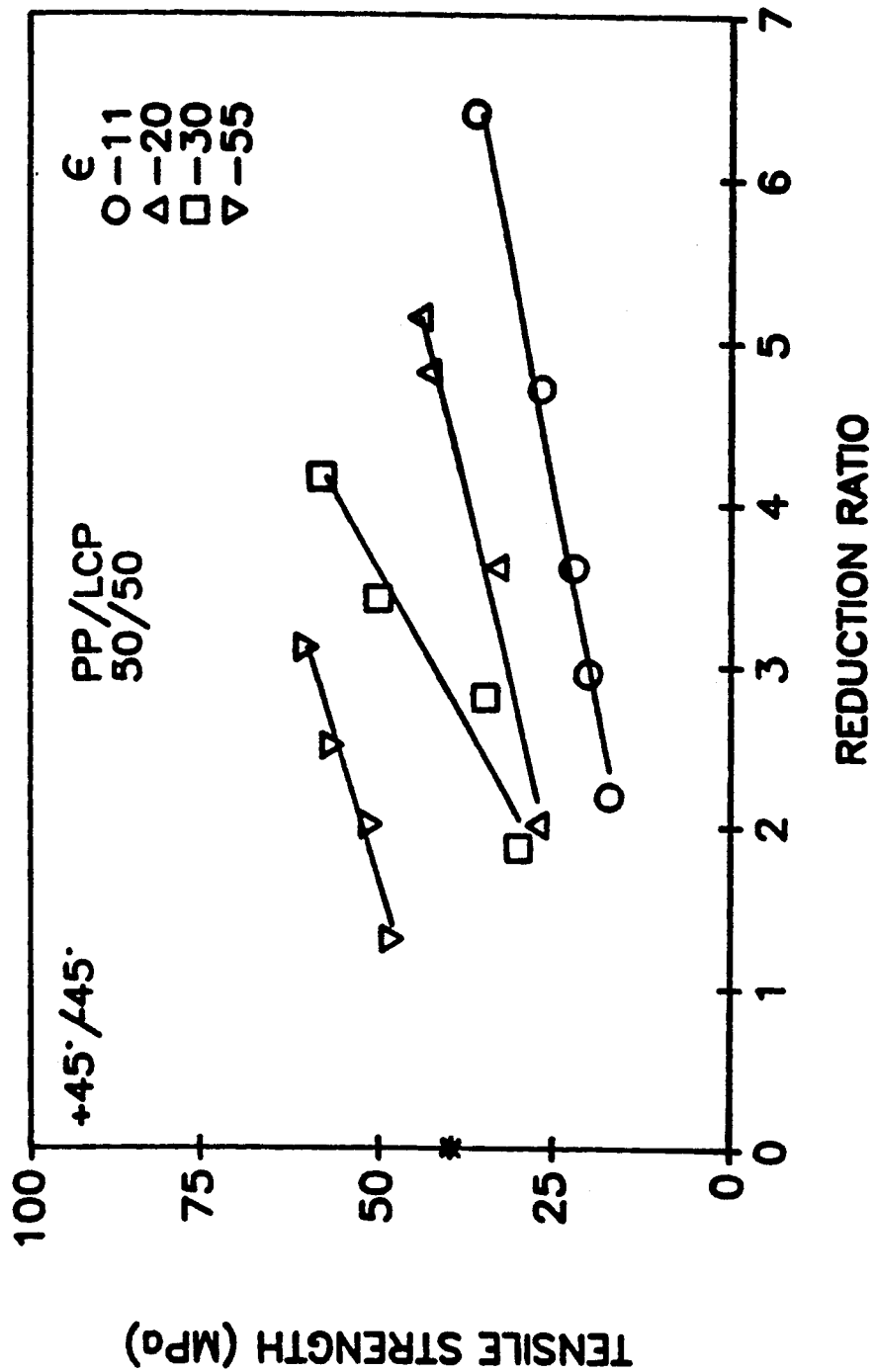
FIG. 17 is a graph showing tensile strength as a function of reduction ratio at various extension ratios in an isotropic 50/50 polypropylene/LCP composite laminate.
Figure 18:
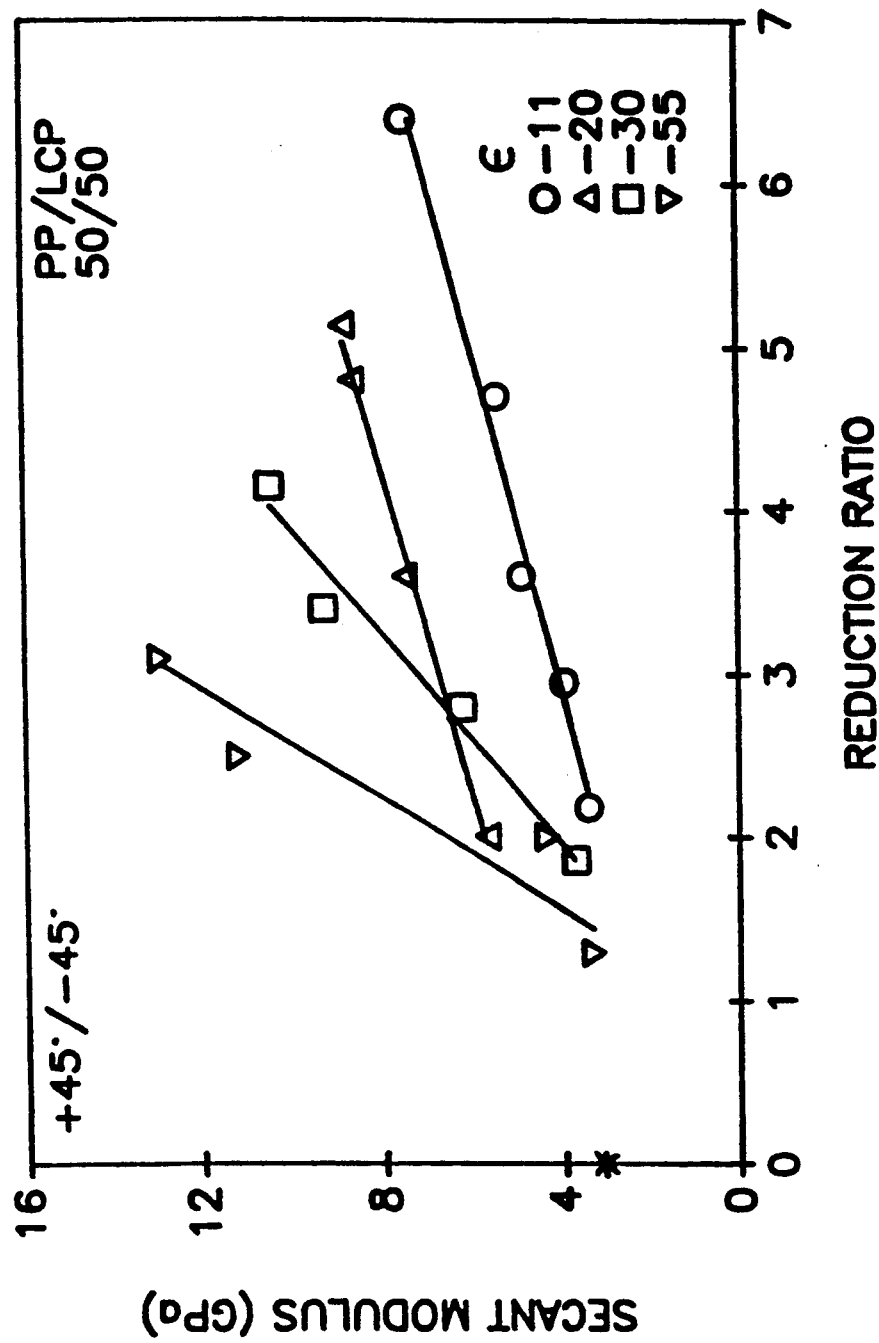
FIG. 18 is a graph showing secant modulus as a function of reduction ratio at various extension ratios in an isotropic 50/50 polypropylene/LCP composite laminate.

Results are as shown graphically in FIGS. 17 and 18. As these figures show, both tensile strength and secant modulus in an isotropic composite laminate are between the fiber direction values and the transverse direction values in an anisotropic laminate formed at the same extension ration and the same reduction ratio.

Figure 19:
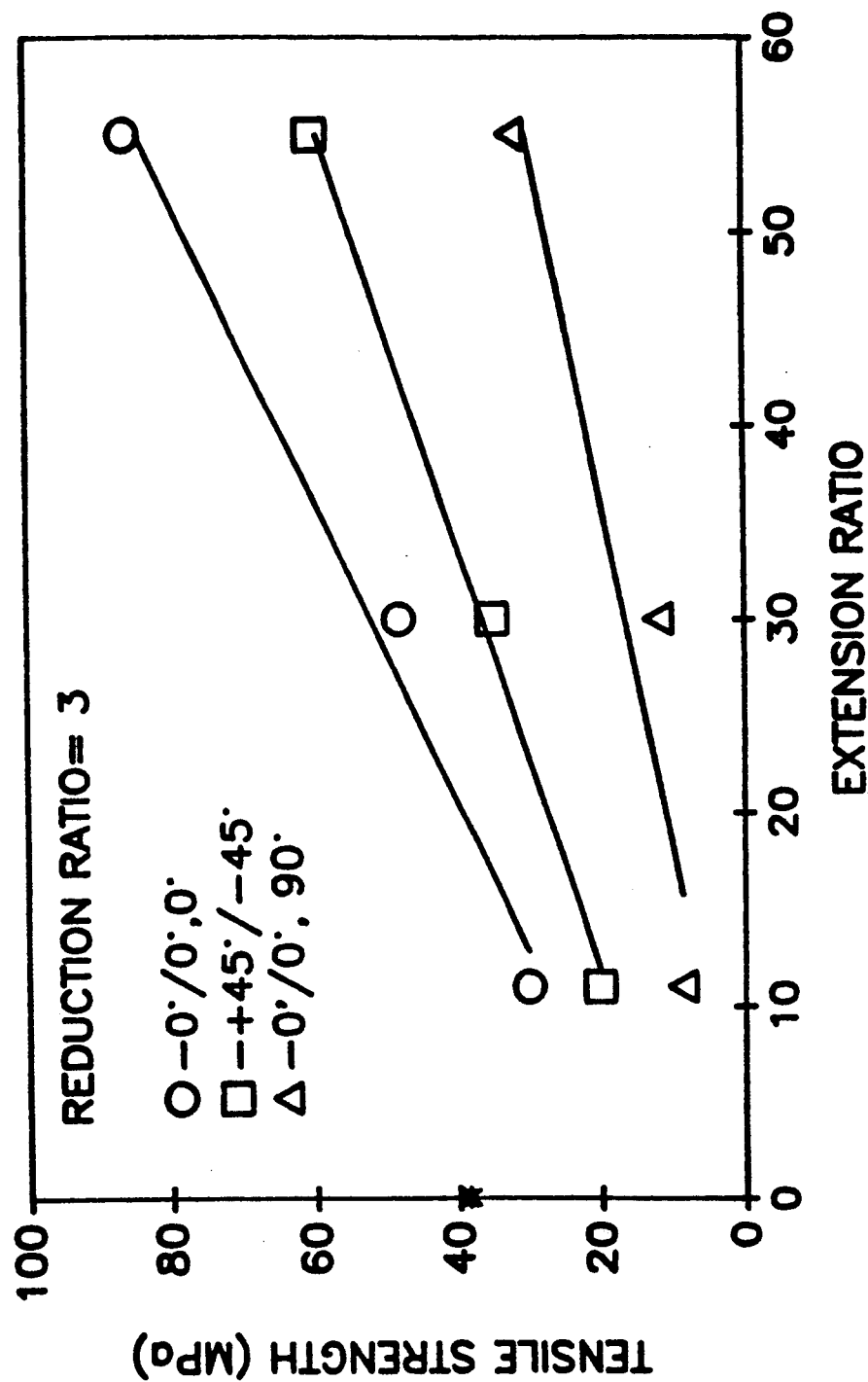
FIG. 19 is a graph showing tensile strength as a function of extension ratio at a constant reduction ratio in both anisotropic and isotropic 50/50 polypropylene/LCP composite laminates; measurements on the anisotropic composite laminate are taken both in the direction of fiber orientation and the cross direction.
Figure 20:
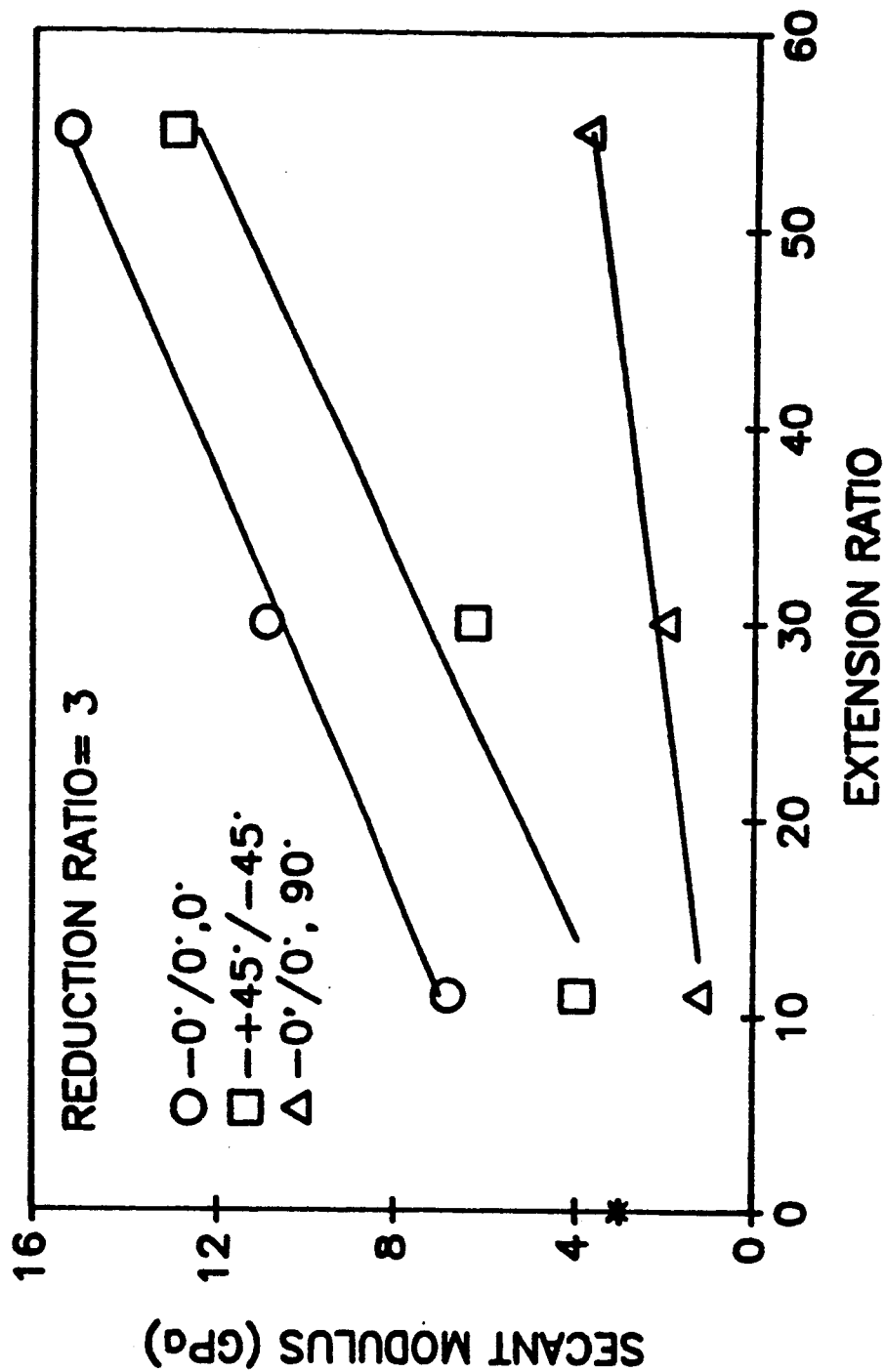
FIG. 20 is a graph showing secant modulus as a function of extension ratio at a constant reduction ratio in both anisotropic and isotropic 50/50 polypropylene/LCP composite laminates; measurements on the anisotropic composite laminate are taken in both the direction of fiber orientation and the cross direction.

FIGS. 19 and 20 show tensile strength and secant modulus in both anisotropic and isotropic 50/50 polypropylene/LCP-2 composite laminates, prepared according to Examples 5 and 6, respectively, as a function of extension ratio at a constant reduction ratio.

While the present invention has been described with respect to specific embodiments thereof, it shall be understood that the invention is not limited thereto or thereby and that modifications can be made without departing from the scope of this invention. Accordingly, this invention shall be as set forth in the appended claims.

What is claimed is:

1. A shaped reinforced thermoplastic composite laminate formed from a plurality of layers of self-reinforced thermoplastic material, each layer comprising essentially unidirectionally oriented fibers of a thermotropic liquid crystal polymer in a matrix of a thermoplastic base polymer, said liquid crystal polymer and said base polymer being incompatible, said liquid crystal polymer and said base polymer having an overlapping melt processing temperature range, the minimum processing temperature of said liquid crystal polymer being higher than the minimum processing temperature of the matrix polymer, said fibers being formed in situ in said matrix under fiber-forming conditions, each layer being formed as a long continuous sheet by a process which comprises extruding a melt blend of said base polymer and said liquid crystal polymer and stretching said long continuous sheet at an extension ratio at least about 11 in order to induce or increase fiber orientation therein;

said laminate being formed by a process which includes stacking individual layers to form a lay-up and shaping said lay-up into a coherent shaped reinforced thermoplastic composite laminate under heat and pressure;

the secant modulus of an anisotropic laminate as claimed herein when measured in the fiber direction, and the secant modulus of an essentially isotropic laminate as claimed herein, being higher than the secant modulus of a non-laminated injection molded sample of the same composition in the fiber direction.

2. A composite laminate according to claim 1 in which the fibers in different are oriented in at least two different directions.

3. A composite laminate according to claim 1 in which the direction of fiber orientation is essentially uniform throughout, whereby said composite laminate is anisotropic.

4. A composite laminate according to claim 1 in which said liquid crystal polymer is a wholly aromatic co-polyester.

5. A composite laminate according to claim 1 in which said liquid crystal polymer has a melting point.

6. A composite laminate according to claim 5 in which the thermoplastic base polymer is polyphenylene oxide and the liquid crystal polymer is a wholly aromatic co-polyester.

7. A composite laminate according to claim 1 in which said liquid crystal polymer has a glass transition temperature but no melting point.

8. A composite laminate according to claim 7 in which said thermoplastic base polymer is polypropylene and said liquid crystal polymer is a wholly aromatic co-polyester.

9. A composite laminate according to claim 7 in which said thermoplastic base polymer is polyetherimide and said liquid crystal polymer is a wholly aromatic co-polyester.

10. A shaped article prepared from the composite laminate of claim 1.

11. A composite laminate according to claim 1 in which said shaping under heat end pressure is carried out at a temperature above the minimum processing temperature of the base polymer but below the minimum processing temperature of the liquid crystal polymer.

12. A composite laminate according to claim 1, said laminate being an anisotropic laminate in which the fibers in all layers are oriented in the same direction, said laminate having a secant modulus in the fiber direction which is greater than the secant modulus of a non-laminated injection molded sample of the same composition in the fiber direction.

13. A composite laminate according to claim 1, said laminate being essentially isotropic as claimed herein and having a secant modulus which is greater than that of a non-laminated injection molded sample of the same composition in the fiber direction.

* * * * *